Figure 2:
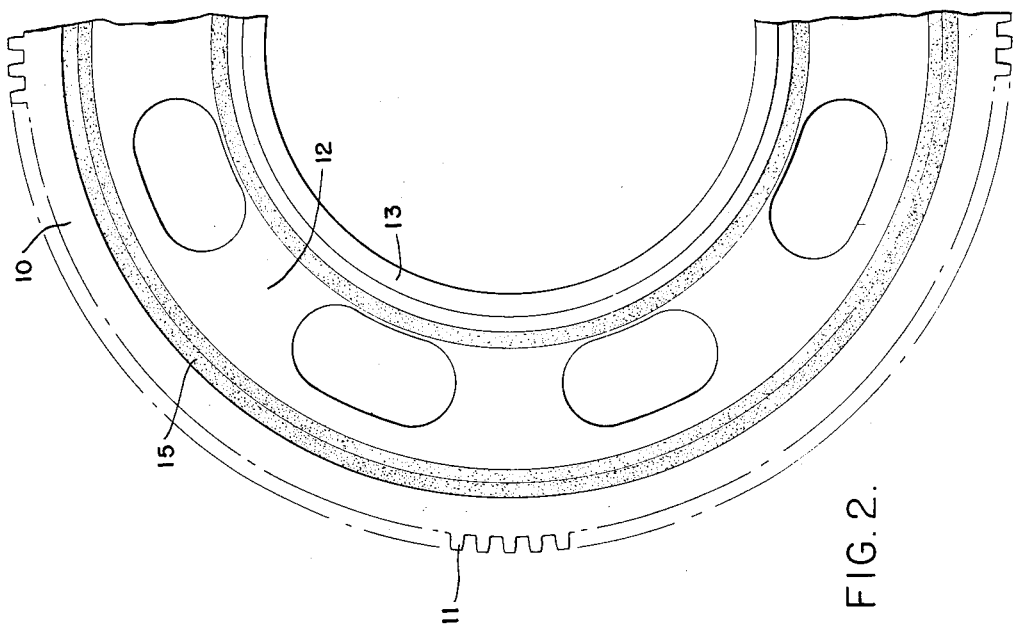

July 31, 1956 N. L. MOCHEL ET AL 2,756,607
GEAR WHEEL AND METHOD OF MAKING
Filed Aug. 29, 1951

WITNESSES:
John M. Wright
V. W. Novak

INVENTORS
Norman L. Mochel
Ira Short
BY
Robert T. French
ATTORNEY

United States Patent Office 2,756,607
Patented July 31, 1956

2,756,607

GEAR WHEEL AND METHOD OF MAKING

Norman L. Mochel, Ridley Park, and Ira Short, Prospect Park, Pa., assignors to Westinghouse Electric Corporation, East Pittsburgh, Pa., a corporation of Pennsylvania Application August 29, 1951, Serial No. 244,196

3 Claims. (Cl. 74—439)

This invention relates to gear wheels, and has for an object the provision of an improved fabricated gear wheel comprising an outer rim formed of low-alloy, high-carbon steel of great hardness carried on a web portion of softer steel.

There is a definite trend toward the use of harder steel in pinions and gears for reduction gears utilized in various services. In such reduction gears it is desirable that at least the rim portions have a Brinell hardness ranging from about 321 to 352, or in some cases higher than 400. With a gear or pinion of relatively small size, it has been found practical to make the gear wheel as a single forging, in which case a uniformly high degree of hardness is readily provided. In other cases, however, as where a gear wheel of large size must be fabricated, it is desirable to provide hub and web portions of ordinary carbon steels and to secure a rim portion of high-carbon steel of great hardness to the web portions. The hard steel of such a rim portion must necessarily be made of steel of such analysis and such hardness that it is not of proper weldable grade.

It has been proposed to obviate this difficulty by forming an outer rim portion of high-carbon steel which can be heat treated to produce suitable hardness, and then to insert into such hardened steel rim an annular rib element formed of low-carbon steel, so that the adjacent surfaces of the outer rim and the annular element will be closely engaged, after which weld material is deposited along the edges of the inner rib element to provide a rim aggregate, the softer rib element being thus adapted to be welded to a suitable web and hub assembly to form the completed gear. Such a construction has not proved entirely satisfactory, however, due in part to the fact that no bond exists between the outer surface of the annular rib element and the inner surface of the hardened steel rim portion intermediate the deposits of weld metal, the latter being thus subjected to severe strains inducing possible failure.

Another object of the invention is to provide a fabricated gear wheel having an outer rim formed of steel of high Brinell hardness, on which an annular pad of relatively soft low-carbon steel is weld-deposited for facilitating the welding thereto of an inner annular web portion of adequate strength.

Another object of the invention is to provide an improved method of fabricating a large gear wheel, which consists of weld-depositing an annular pad of relatively soft low-carbon steel on the inner surface of an annular rim formed of low-alloy, high-carbon steel, heat treating the entire rim and pad to harden the outer rim, and then welding an annular web member to the unhardened pad of low-carbon steel.

Figure 1:
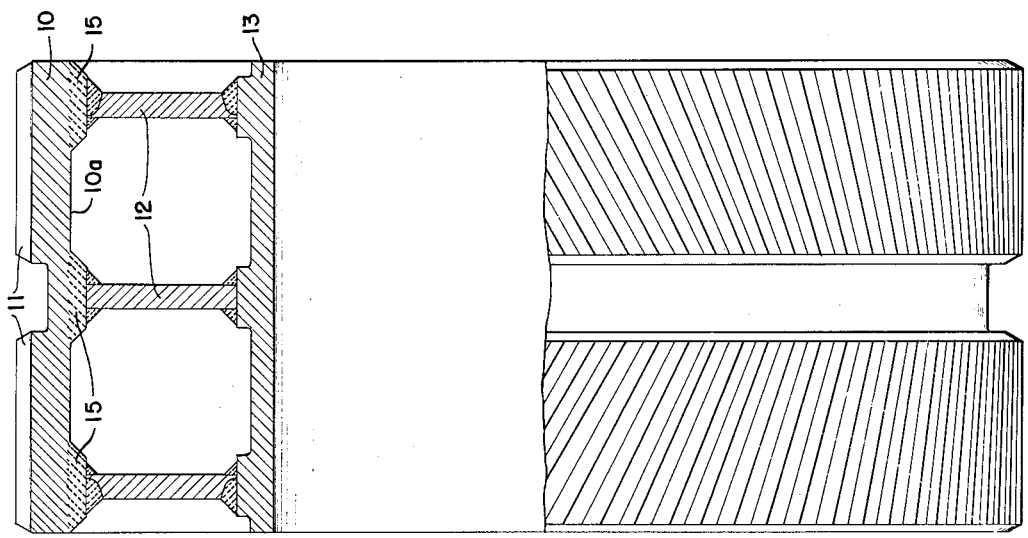

These and other objects are effected by the invention as will be apparent from the following description and claims taken in connection with the accompanying drawing, forming a part of this application, in which:

Fig. 1 is an elevational view, partly in section, of a fabricated gear wheel constructed in accordance with the invention; and Fig. 2 is a fragmentary plan view of the gear wheel shown in Fig. 1.

Referring to Fig. 1, a typical large gear wheel comprises an outer annular rim 10 having one or more rows of teeth 11 formed thereon, a plurality of axially spaced annular web portions 12, and an inner cylindrical hub portion 13, the web portions 12 being adapted to have their inner edges welded to the hub portion 13 and their outer peripheral edges secured to the inner surface of the outer rim 10. It will be understood that the outer rim portion 10 is adapted to be formed of a suitable low-alloy or high-carbon steel which may be heat treated to establish a high Brinell hardness, while the web portions 12 and hub portion 13 are adapted to be formed of relatively soft steel of weldable quality.

According to the invention, the outer annular rim portion 10 is first formed of high-carbon steel and properly machined prior to any heat treatment thereof. One or more annular pads 15 of low-carbon steel are then formed by depositing molten material in adequate quantity on the inner surface 10a of the rim portion, following which the entire rim portion 10 with the interior pads 15 is subjected to heat treatment to produce the desired hardness in the rim portion. Due to the composition of the low-carbon steel pads 15, the latter will not respond to this heat treatment but will remain relatively soft. The assembly of the hub portion 13 and annular web portions 12 is then inserted to bring the web portions into alignment with the respective pads 15 of the outer rim 10. The abutting annular pads 15 and peripheral edges of the web portions 12 are then welded together to produce the completely fabricated gear wheel assembly.

It will thus be seen that with the hardened steel rim thus provided with circular pads of weld-deposited metal laid down on the inside surface thereof prior to heat treating, in such positions as to register with the web portions of the assembly, welding of the low-carbon steel pads to the low-carbon steel of the web portions may readily be accomplished to produce an integral gear wheel structure having great strength and adapted for a long service life. One of the principal reasons for the great strength attained in an integral gear wheel made in accordance with the invention lies in the full and complete autogenous connections existing between the opposed faces of the built-up pads and the rim.

On gear wheels of very large diameter side walls 12 may be made in two parts. An outer annular ring could be welded to the rim 10 taking the place of the annular pads 15 and be heat treated with rim 10. The remainder inner portion of the side walls 12 would be welded to the outer ring on assembly.

On smaller wheels it may be possible to weld side walls 12 directly to the rim in place of the annular ring 15, and to heat treat these side walls with the rim. The side walls 12 would be welded to the hub 13 on final assembly.

While the invention has been shown in but one form, it will be obvious to those skilled in the art that it is not so limited, but is susceptible of various changes and modifications without departing from the spirit thereof.

What is claimed is:

1. In a fabricated gear wheel, an outer annular rim portion formed of low-alloy, high-carbon steel having a Brinell hardness ranging from about 321 to more than 400, said rim portion having an inner surface, an annular pad portion of relatively soft, low-carbon steel weld deposits integrally formed on said inner surface of said rim portion, the entire interface between said inner surface of the rim portion and the outer surface of said pad portion being autogenously connected, said rim portion with said pad portion being adapted for heat treatment to establish the desired rim hardness, a hub portion, an annular web portion of steel having weldable properties and carried by said hub portion and having a peripheral surface engaging said low-carbon steel pad portion, and weld deposits autogenously connecting said web portion to said pad portion.

2. A fabricated gear wheel comprising an outer annular rim portion formed of low-alloy, high-carbon steel having a high Brinell hardness, said rim portion having an inner surface, weld deposits of relatively soft, low-carbon steel providing a plurality of axially spaced annular pad portions autogenously connected to the inner surface of said rim portion, whereby the entire interfacial areas between said inner surface of the rim portion and the outer surfaces of said pad portions are autogenously connected, a hub portion, a plurality of annular web portions carried on said hub portions in alignment with said pad portions, respectively, the peripheral edges of said web portions engaging said relatively soft pad portions, and weld deposits disposed along said peripheral edges and forming autogenous connections between said web portions and said pads to provide an integral gear wheel structure of adequate strength and wearing characteristics.

3. The method of fabricating a gear wheel having an outer rim portion of high Brinell hardness, which comprises the steps of forming a rim portion of low-alloy, high-carbon steel, weld-depositing an annular pad of low-carbon steel on the inner surface of said rim portion, heat treating the entire rim portion and pad to cause the rim portion to acquire the desired hardness while the low-carbon pad remains relatively soft, and then welding an inner annular web portion having weldable properties to said low-carbon steel pad.

References Cited in the file of this patent

UNITED STATES PATENTS

| | | |
|---|---|---|
| 1,804,837 | Lunn | May 12, 1931 |
| 1,908,187 | Ross | May 9, 1933 |
| 2,054,782 | Day | Sept. 15, 1936 |
| 2,201,247 | Short | May 21, 1940 |
| 2,221,415 | Short | Nov. 12, 1940 |
| 2,249,629 | Hopkins | July 15, 1941 |
| 2,320,164 | Anderson | May 25, 1943 |
| 2,506,641 | Hoover | May 9, 1950 |

FOREIGN PATENTS

| | | |
|---|---|---|
| 2,730 | Great Britain | Oct. 9, 1862 |
| 973,556 | France | Sept. 20, 1950 |